United States Patent [19]

Sasaki et al.

[11] Patent Number: 5,113,503
[45] Date of Patent: May 12, 1992

[54] DATA PROCESSOR PROVIDING PLURAL DECODERS FOR EFFECTING FAST REGISTER SELECTION

[75] Inventors: Hisao Sasaki, Tachikawa; Hideo Maejima; Takashi Hotta, both of Hitachi, all of Japan

[73] Assignee: Hitachi, Ltd., Tokyo, Japan

[21] Appl. No.: 888,937

[22] Filed: Jul. 24, 1986

[30] Foreign Application Priority Data

Jul. 24, 1985 [JP] Japan ................. 60-161885

[51] Int. Cl.⁵ .................. G06F 9/30; G06F 9/308
[52] U.S. Cl. .................. 395/375; 364/262.7; 364/262.8; 364/946.5; 364/946.6; 364/DIG. 2
[58] Field of Search ... 364/200 MS File, 900 MS File

[56] References Cited

U.S. PATENT DOCUMENTS

| | | | |
|---|---|---|---|
| 4,342,078 | 7/1982 | Tredennik et al. | 364/200 |
| 4,398,245 | 8/1983 | Fujita | 364/200 |
| 4,446,517 | 5/1984 | Katsura et al. | 364/200 |
| 4,566,063 | 1/1986 | Zolonowsky et al. | 364/200 |
| 4,584,666 | 4/1986 | Zolnowsky et al. | 364/900 |
| 4,674,063 | 6/1987 | Sato | 364/900 |
| 4,812,972 | 3/1989 | Chastain et al. | 364/200 |
| 4,873,629 | 10/1989 | Harris et al. | 364/200 |

*Primary Examiner*—Thomas C. Lee
*Assistant Examiner*—Ayni Mohamed
*Attorney, Agent, or Firm*—Antonelli, Terry, Stout & Kraus

[57] ABSTRACT

A data processor has an execution unit, an instruction register in which macro instructions having a register field are set for specifying registers in the execution unit, a micro ROM in which micro instructions containing a register instruction field are set, a first decoder for decoding the register specification data from the instruction register, a second decoder for decoding the register specification data from the micro ROM, and a selector for selecting either of the output of the first decoder or that of the second decoder corresponding to the selection signals provided from the micro ROM and thus producing data for specifying the registers. In this data processor having such a configuration, the decodings of the two register specification data described above are carried out substantially in parallel and a high-speed operation is thus made possible.

13 Claims, 3 Drawing Sheets

DATA PROCESSOR PROVIDING PLURAL DECODERS FOR EFFECTING FAST REGISTER SELECTION

BACKGROUND OF THE INVENTION

This invention relates to a data processing technique, and particularly to a technique which may be effectively applied to a micro computer system, for example, a micro processor of a microprogram control system.

A control system in a micro processor includes a microprogram control system in which the controls of a data transfer sequence and of an operation sequence for an execution unit comprising an adder and registers are carried out in accordance with a microprogram stored in a read only memory (a control storage unit, referred to as micro ROM hereinafter).

When a register in an execution unit is specified in a micro processor of such a microprogram control system, there is a system, as shown in FIG. 5, in which either machine language instruction code B introduced in an instruction register IR or a micro instruction code C read from a micro ROM, $\mu$-ROM, is selected by a selector SEL and is then provided for an address decoder AD so that the selected micro instruction code is decoded by the address decoder and the specification signals $D_1, D_2, \ldots D_n$ of the register are produced.

In the above-described system, the selection of the machine instruction code or the micro instruction code in the selector SEL is performed by switch signals S output from the decoder DEC (not shown in the figure) which receives part of the micro instruction code read from the micro ROM, $\mu$-ROM.

An invention with respect to the system in which, as described above, the content either of the micro ROM for carrying out control storage or the register is selected by the selector and then provided for the decoder so as to produce control signals such as register specification signals is described, for example, in Japanese Patent Publication No. 25251/1984.

However, the above-described system for the production of control signals has the disadvantage that the operation speed is slow, as described below. Namely, the switch signals S are produced by providing the decoder DEC with the output A of the micro ROM, $\mu$-ROM, as shown in FIG. 6-B, and either the micro instruction code C or the machine language instruction code B is selectively provided for the address decoder AD on the basis of the switch signals S, resulting in the production of the specification signals $D_1, D_2, \ldots$ for specifying the register, etc. That is to say, the decoding in the decoders DEC and AD is conducted in time series. Consequently, it has been found by the inventors of this invention that the above system involved the disadvantage that the production of the specification signals $D_1, D_2, \ldots$ is delayed by a total time equivalent to the sum of the individual decoding time of each of the decoders and the operation, speed is thus very slow.

SUMMARY OF THE INVENTION

It is an object of the present invention to provide a system for producing control signals capable of improving the operation speed in a micro processor of a microprogram control system.

The above-described and other objects and the novel characteristics will be made clear from the description and the appended drawings of this specification.

A representative embodiment of the invention disclosed in this application will be summarized hereinafter.

Decoders for decoding the contents of particular memory means such as the micro ROM and the instruction register in which control data is recorded are provided so that either output of the two decoders is selected as a control signal and provided for the execution unit. The decoding operations in the two decoders and the decoding operation in a decoder for producing selection signals which select either of these decoder outputs or switch them over are made capable of being carried out in parallel. This achieves the above-mentioned object whereby the time from the reading-out of the instruction code in the micro ROM until the production of the control signals, is reduced, thus leading to an overall increase in the operation speed.

PREFERRED EMBODIMENT

Figure 1:
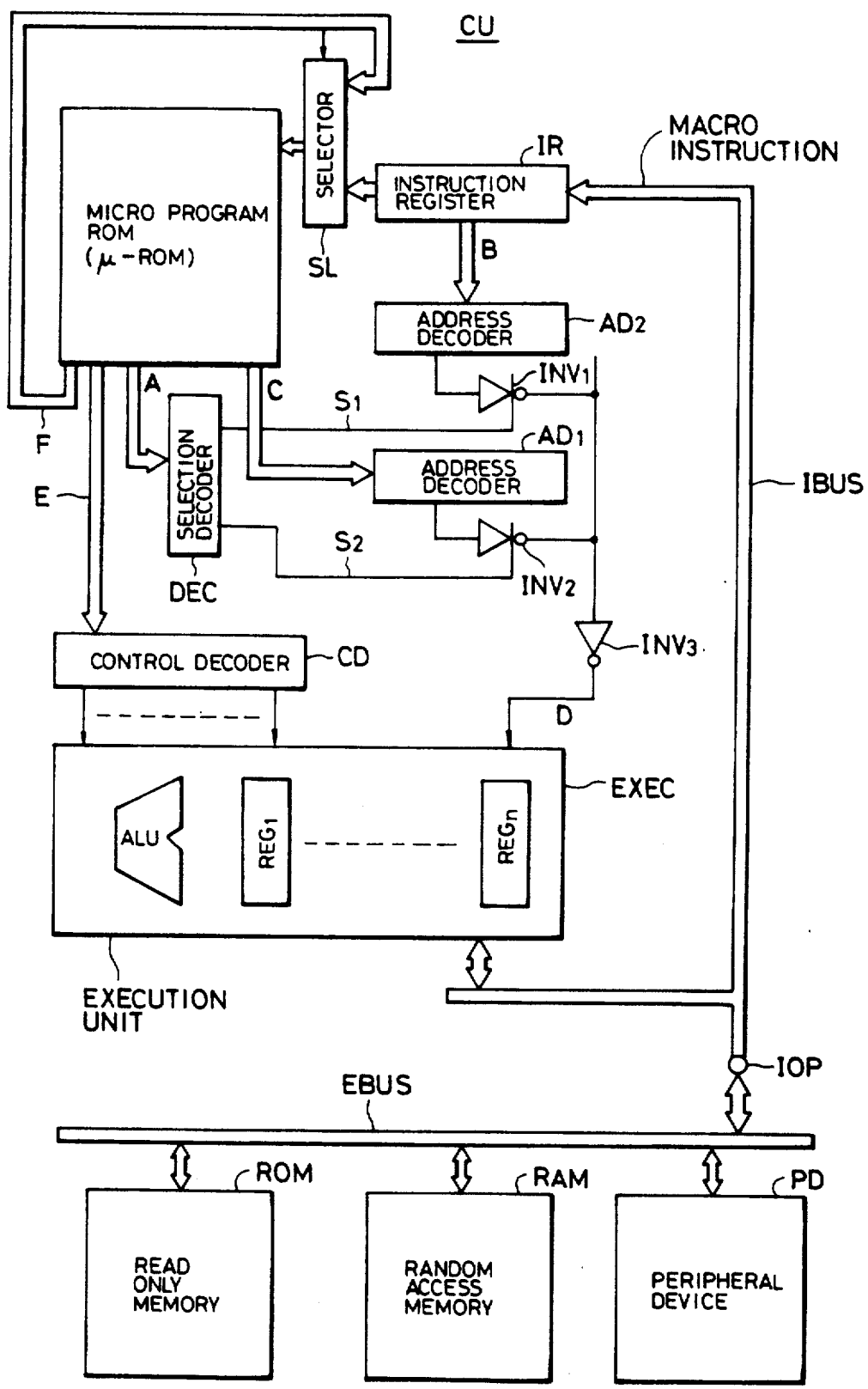
FIG. 1 is a block drawing showing an embodiment in which this invention is applied to a micro processor of a microprogram control system.

FIG. 1 shows a block drawing of an embodiment in which this invention is applied to a micro processor of a microprogram control system.

The micro processor in this embodiment comprises a control unit CU and an execution unit EXEC. The execution unit comprises an adder or ALU (arithmetic and logic unit) and a group of various registers such as a program counter and an accumulator $REG_I \ldots REG_n$ which are controlled by control signals provided from the control unit CU. By this means, a data transfer sequence and an operation sequence are effectively controlled.

The control unit CU comprises an instruction register IR for holding a macro instruction (machine language instruction) introduced from the outside, a selector SL, a macro ROM, $\mu$-ROM, in which a microprogram comprising a plurality of control languages, that is a micro instruction, is stored, a control decoder CD for producing control signals for the above execution unit EXEC by decoding the micro instruction read out from the micro ROM, $\mu$-ROM, address decoders AD1 and AD2, and control gate circuits INV1 to INV3.

Figure 2:
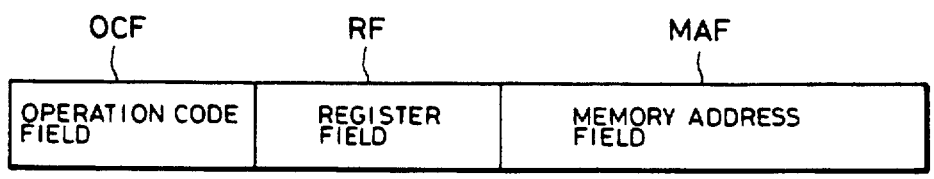
FIG. 2 is a field configuration drawing of a macro instruction.

The macro instruction introduced in the, instruction register is not particularly limited in formats; for example, it may comprise an operation code field OCF, a register field RF in which data is set for specifying the registers of the execution unit EXEC, a read only memory ROM, a random access memory RAM, and a memory address field MAF for specifying the addresses of a peripheral device PD, etc., as shown in FIG. 2.

Each micro instruction in the micro ROM, μ-ROM, comprises a static control field SCF for producing the control signals for the execution unit EXEC, a sequence control field SQCF for designating the address of the next micro instruction, a register field RFM for specifying the register to be used for the execution of an instruction, and selection bits for specifying the register field of either the micro instructions or the machine language instructions to be used.

Figure 3:
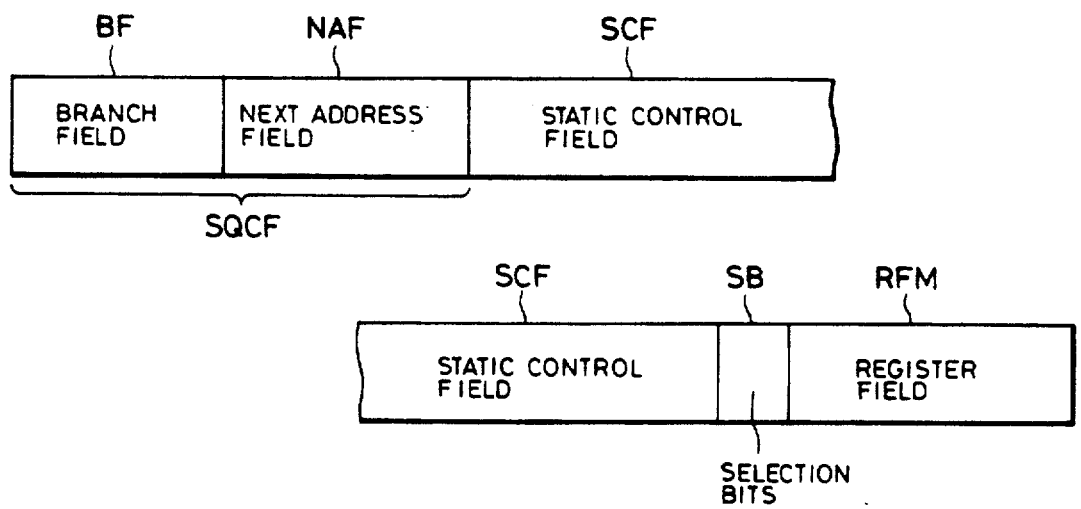
FIG. 3 is a field configuration drawing of a micro instruction.

FIG. 3 shows an example of the configuration of the micro instructions read out from the micro ROM, μ-ROM.

The operation of the selector SL shown in FIG. 1 is controlled by the instruction or the signals in a branch field BF among the micro instructions output from the micro ROM so as to select either the operation code of the macro instruction introduced in the instruction register IR or the next address data provided from a next address field MAF. The selector SL is controlled such as to select the next address data output from the micro ROM until a plurality of micro instructions corresponding to one macro instruction are completely read out.

In the embodiment shown in FIG. 1, the macro instructions are particularly limited but they are recorded in a ROM connected to an external system bus EBUS.

When one macro instruction is executed, the ROM is accessed so as to provide the macro instruction to be next executed read out from the ROM for the instruction register IR through the external system bus EBUS, an input-output port IOP, and an internal bus IBUS, a new macro instruction being set in the instruction register IR thereby.

In a situation in which one macro instruction has been executed, the selector SL is so controlled as to select the operation code in the macro instructions in the instruction register IR. Therefore, the operation code in new macro instructions is provided for the micro ROM through the selector SL. This operation code represents the address of the micro ROM in which is stored the first micro instruction of a plurality of the micro instructions corresponding to one macro instruction.

Thus, the operation code of the macro instruction introduced in the instruction register IR reads out the first micro instruction from the micro ROM, μ-ROM. The next micro instruction is then read out on the basis of the next address and the branch address in the sequence control field of the read-out micro instruction and the operation code of the macro instruction. In such a manner, one macro instruction is executed by a group of micro instructions. It is possible to have a micro instruction which is common to some of the micro instructions for common use.

This embodiment is provided with a select decoder DEC for decoding the content of the selection bits output from the selection bits field SB in the micro instructions so as to produce selection signals $S_1$ and $S_2$, an address decoder $AD_1$ for decoding the code (register number) in the register field RFM of the micro instruction read out from the micro ROM, μ-ROM, and an address decoder $AD_2$ for decoding the code in the register field RF of the macro instructions introduced in the instruction register IR. The address decoders $AD_1$ and $AD_2$ are, for example, configured by a PLA (programmable logic array).

The decoded output of the above address decoders $AD_1$ and $AD_2$ is provided for the input terminals of clocked inverters $INV_1$ and $INV_2$ which respectively form the control gate circuits. The control gates of these clocked inverters $INV_1$ and $INV_2$ are controlled by the selection signals output from the above-described select decoder DEC. That is to say, the decoded output of either of the address decoders $AD_1$ and $AD_2$ is provided as the register signal for the execution unit EXEC by the selection signals $S_1$ and $S_2$ through the inverter $INV_3$.

Figure 4:
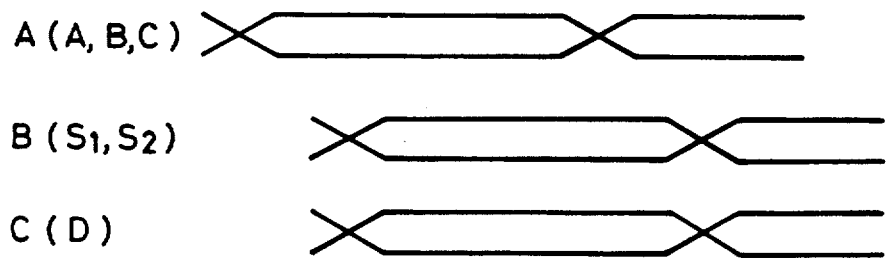
FIG. 4 is an explanatory drawing showing the operation timing of each decoder in the micro processor shown in FIG. 1.
Figure 6:
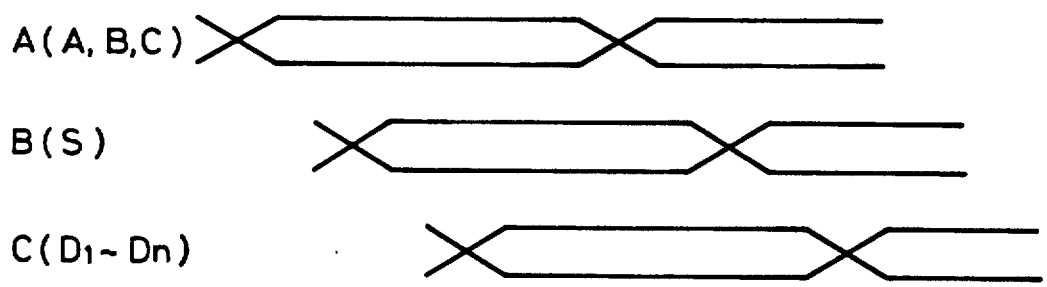
FIG. 6 is an explanatory drawing showing the operation timing of the decoder in the micro processor shown in FIG. 5.

In the above-described embodiment, the decoding in the selection decoder DEC is carried out at the same time as the decoding in the address decoders $AD_1$ and $AD_2$. Thus, the time from the reading-out of selection bits code A and a register code C from the micro ROM, μ-ROM, and a register code B from the instruction register IR until the production of the selection signals $S_1$ and $S_2$ is substantially equal to the time until the production of the decoded output (register signal) D in the address decoders $AD_1$ and $AD_2$, as shown in FIG. 4. Namely, the time until the production of the register signal, as shown in FIG. 6, is not the sum of the decoding time in the selection decoder DEC and the decoding time in the address decoder AD, but it depends upon the longer time required for decoding, the other decoding time being absorbed therein.

Figure 5:
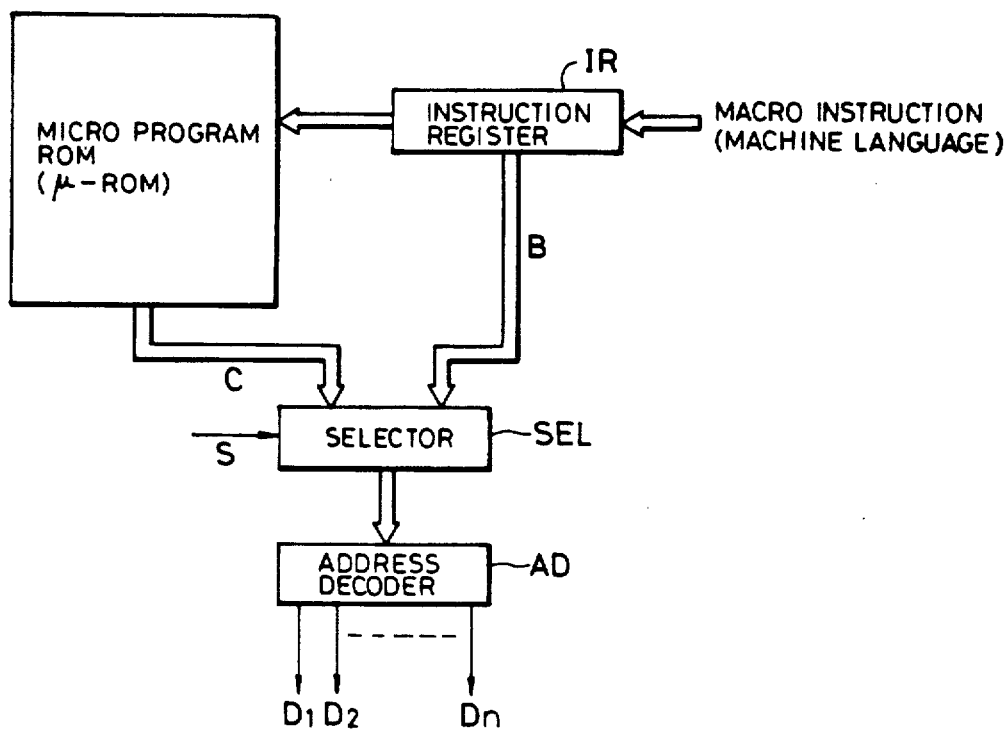
FIG. 5 is a block drawing showing a configuration example of a micro processor of a conventional microprogram control system.

As a result, in this embodiment, the register specification signal is produced at a speed which is about 30% higher than that in the register signal production system shown in FIG. 5 and the operation speed of the micro processor is thus accelerated.

In the above-described embodiment, since the address decoders $AD_1$ and $AD_2$ are provided in correspondence with the micro ROM, μ-ROM, and the instruction register IR, respectively, the area occupied by the address decoders is double that in the circuit shown in FIG. 5. However, the chip area is increased only 0.3% in this embodiment.

Particularly, a read register must first be specified for moving to the next operational processing in a given operation and thus the time required for the operational processing is finally reduced in the system of the above embodiment by accelerating the specification of the register.

In the above-described embodiment, the decoded signal either of the micro instruction code in the micro ROM, μ-ROM, or the machine language instruction code in the instruction register. IR is selected as the register specification signal but the code to be decoded, that is the register in which the control data is stored, is not limited to the instruction register IR and may be another register. For example, when an operation is carried out and the next register is then specified on the basis of the results thereof, a decoder for decoding the content of a particular register in the execution unit may be provided in place of the instruction register IR so that either the decoded output of the decoder or the decoded output of the micro instruction code is selected as the register signal by the selection signals from the selection decoder DEC.

For the micro ROM, μ-ROM, another particular register may be provided in place of the instruction register IR in a similar manner. Furthermore, decoders for decoding the contents of the three control data storage means, i.e. the micro ROM, the instruction register, and a particular register in the execution unit, may be provided so that the decoded output of one of three decoders is selected as the register signal by the selection signals of the selection decoder DEC.

In addition, the above embodiment shows the production of the selection signals for specifying the register in the execution unit, but this embodiment is not limited to this and may be applied to the production of control signals other than the register specification.

This invention has the following advantage. Since the decoders for decoding the contents of the particular storage means such as the micro ROM and the instruction register in which the control data is recorded are provided so as to select either of the outputs of these decoders as the control signals and to provide them for the execution unit, the time from the reading-out of the instruction code of the micro ROM to the production of the control signals is reduced and the operation speed is accelerated since the decoding in the two above-described decoders is carried out in parallel with the decoding in the decoder which produces the selection signals for performing the selection of either of the decoded outputs or the switch-over thereof.

The invention achieved by the inventors is described in detail hereinabove with reference to the embodiment, but this invention is not limited to the above-mentioned embodiment and may be changed in various mays within the scope of the summary. For example, if three or more address decoders are provided, the control signals selected by the selection decoder may be two or more.

The invention achieved by the inventors is explained mainly with respect to its application to a micro processor of a microprogram control system which is the background and an applicable field of the invention, but it is not limited to this application. For example, the invention may generally be employed in a data processor such as a computer comprising a control unit and an execution unit.

We claim:

1. In a data processor having a control unit for controlling an execution unit, said control unit comprising:
   first decoder means for decoding first control data in a macroinstruction;
   storage means for storing second control data and a selection signal, and including read-out means for reading out said second control data and said selection signal in response to said macroinstruction;
   second decoder means connected to said storage means for decoding second control data read out of said storage means by said read-out means; and
   selection means, responsive to information, obtained during an operation coextensive with the decoding by said first and second decoding means from said selection signal read out by said read-out means, for selecting an output of either said first decoder means or said second decoder means to be supplied to said execution unit.

2. A data processor according to claim 1, wherein said control unit further comprises an instruction register for holding said macroinstruction including said first control data, and wherein said storage means comprises a read only memory for storing microinstructions including said second control data.

3. A data processor according to claim 2, wherein said read-out means is responsive to said macroinstruction held in said instruction register for reading out from said read only memory at least one microinstruction having a field including said selection signal.

4. A data processor according to claim 2, in which said execution unit comprises at least a plurality of registers and said first and said second control data comprise coded data for the purpose of specifying the registers in said execution unit.

5. A data processor according to claim 4 further comprising a third decoder means for producing selection control signals for controlling said selection means by decoding the selection signal output from said read only memory.

6. A data processor according to claim 5, in which said read only memory is so configured as to produce the first control data.

7. A method of controlling the processing of control data in a microcomputer system having storage means for delivering second control data based on first control data and an execution unit for operating on the basis of said first control data or said second control data, comprising the steps of:
   (a) decoding said first control data by means of a first decoder;
   (b) decoding said second control data by means of a second decoder;
   (c) decoding a selection control signal by means of a third decoder at the same time said second control data is being decoded by said second decoder; and
   (d) selecting one of the outputs of said first decoder or said second decoder based on said decoded selection control signal.

8. A method according to claim 7, wherein said selection control signal is supplied from said storage means.

9. A method according to claim 8, further comprising the step of:
   (d) delivering the selected one of the outputs to an execution unit.

10. A method according to claim 9, further comprising the step of:
    (e) specifying a register in said execution unit based on the selected one of the outputs of said first and second decoders.

11. In a data processor, a control unit for controlling the operation of an execution unit in response to microinstructions which include a register field, comprising:
    instruction register means for holding a macroinstruction;
    control storage means for storing a plurality of sets of microinstructions at least some of which include a register field and a selection field, including means responsive to a macroinstruction held by said instruction register means for sequentially reading out the microinstructions of a selected set of microinstructions;
    first decoder means connected to said instruction register means for decoding the content of the register field of a macroinstruction held by said instruction register means;
    second decoder means connected to said control storage means for decoding the content of the register field of a microinstruction read out of said control storage means; and
    selection means, connected to said first and second decoder means and responsive to information, obtained during an operation coextensive with the decoding by said first and second decoding means from the selection field of said microinstruction read out of said control storage means, for selecting an output of either said first decoder means or said second decoder means to be supplied to said execution unit.

12. A data processor according to claim 11, wherein said execution unit comprises a plurality of registers, and said register field of said macroinstruction and said register field of said microinstructions comprise coded data for specifying registers in said execution unit.

13. A data processor according to claim 11, further comprising third decoder means connected to receive and decode the content of said selection field of said microinstruction read out of said control storage means for controlling the operation of said selection means.

* * * * *